US012514276B2

(12) United States Patent
Achkar et al.

(10) Patent No.: US 12,514,276 B2
(45) Date of Patent: Jan. 6, 2026

(54) MANUFACTURING OF EXTRUDATES HAVING IMPROVED MICROBIAL QUALITY

(71) Applicant: DSM IP ASSETS B.V., Heerlen (NL)

(72) Inventors: Jihane Achkar, Kaiseraugst (CH); Alan Connolly, Kaiseraugst (CH); Kai Urban, Kaiseraugst (CH)

(73) Assignee: DSM IP ASSETS B.V., Maastricht (NL)

( * ) Notice: Subject to any disclaimer, the term of this patent is extended or adjusted under 35 U.S.C. 154(b) by 677 days.

(21) Appl. No.: 16/977,303

(22) PCT Filed: Mar. 14, 2019

(86) PCT No.: PCT/EP2019/056446
§ 371 (c)(1),
(2) Date: Sep. 1, 2020

(87) PCT Pub. No.: WO2019/175324
PCT Pub. Date: Sep. 19, 2019

(65) Prior Publication Data
US 2021/0045427 A1     Feb. 18, 2021

(30) Foreign Application Priority Data
Mar. 15, 2018 (EP) .................................. 18162019

(51) Int. Cl.
*A23P 30/20* (2016.01)
*A23L 7/10* (2016.01)
*A23L 33/15* (2016.01)

(52) U.S. Cl.
CPC .............. *A23P 30/20* (2016.08); *A23L 7/101* (2016.08); *A23L 33/15* (2016.08)

(58) Field of Classification Search
CPC .... A23V 2250/5118; A23V 2250/7056; A23V 2250/7046; A23V 2250/70; A23V 2300/16; A23L 7/109; A23L 33/15; A23L 7/101; A23P 30/00; A23P 30/20
USPC .......... 426/448, 74, 516, 618, 622, 648, 439
See application file for complete search history.

(56) References Cited

U.S. PATENT DOCUMENTS

| | | | | |
|---|---|---|---|---|
| 3,846,563 A | * | 11/1974 | Cunningham | A23L 7/109 426/607 |
| 4,816,281 A | * | 3/1989 | Moriyama | A23L 7/109 425/461 |
| 5,599,573 A | * | 2/1997 | Barnes | A23L 7/111 426/325 |
| 5,667,833 A | | 9/1997 | Juengling et al. | |
| 5,997,934 A | | 12/1999 | Geromini et al. | |
| 11,278,046 B2 | * | 3/2022 | Kirchen | A23K 20/174 |
| 2002/0058089 A1 | | 5/2002 | Burri et al. | |
| 2006/0292278 A1 | | 12/2006 | Brugger et al. | |
| 2014/0069344 A1 | | 3/2014 | Lipscomb et al. | |

FOREIGN PATENT DOCUMENTS

| | | |
|---|---|---|
| JP | 11-196771 | 7/1999 |
| JP | 2002-092246 | 3/2002 |
| JP | 2002-538846 | 11/2002 |
| JP | 2002-538847 | 11/2002 |
| JP | 2003-511024 | 3/2003 |
| JP | 2006-523445 | 10/2006 |
| WO | 01/25414 | 4/2001 |
| WO | 2014/164956 | 10/2014 |
| WO | 2017/060320 | 4/2017 |

OTHER PUBLICATIONS

Bakerpedia, Semolina, retrieved online Apr. 26, 2023 https://bakerpedia.com/ingredients/semolina/#:~: text=Typical%20composition%20of%20this%20type,Water%3A%2012.7%25 (Year: 2023).*
International Search Report for PCT/EP2019/056446 dated Nov. 7, 2019, 5 pages.
Written Opinion of the ISA for PCT/EP2019/056446 dated Nov. 7, 2019, 6 pages.
Debbouz et al., "Process Effect on Couscous Quality", Cereal Chemistry, Jan. 1, 1996, vol. 73, No. 6, XP009084109, pp. 668-671 (4 pages).
Debbouz, A. et al., *Process Effect on Couscous Quality*, Cereal Chemistry, AACC International Inc., US (Jan. 1, 1996), vol. 73, No. 6, pp. 668-671 (1996).
BR Application No. BR11210200184694, Search Report, Jul. 7, 2023.
Notice of Reasons for Rejection, JP Patent Application No. 2020-544764, Oct. 4, 2022.
Notice of Reasons for Rejection, JP Patent Application No. 2020-544764, Apr. 25, 2023.
Vitamin & Probiotic Degradation White Paper, Degradation of Vitamins And Probiotics Caused By Exposure to Heat, Water and Sunlight, Green Circle Capital Advisors, https://greencirclecap.com/vitadegradation/, Jun. 2018.
Markus Schirmer et al., "Starch gelatnization and its comoplexity for analysis", Starch 2015, 67, 30-41.
Sixing Lai et al, "Effects of different extrusion temepratures on physicochemical, rheological and digestion properties of rice flour produced in a pilot-scale extruder", International Journal of Food Science and Technology 2022, 57, 6773-6784.

* cited by examiner

*Primary Examiner* — Hong T Yoo
(74) *Attorney, Agent, or Firm* — NIXON & VANDERHYE P.C.

(57) ABSTRACT

The present invention relates to extrudates comprising water-soluble vitamins and other micronutrients. They are obtainable by adiabatic extrusion. During extrusion, temperature is controlled by the viscosity of the composition which is being extruded. Pasteurization temperature is reached, i.e. the extrudates of the invention meet the requirements set out in microbiological guidelines.

21 Claims, 5 Drawing Sheets

MANUFACTURING OF EXTRUDATES HAVING IMPROVED MICROBIAL QUALITY

CROSS-REFERENCE TO RELATED APPLICATIONS

Figure 1:
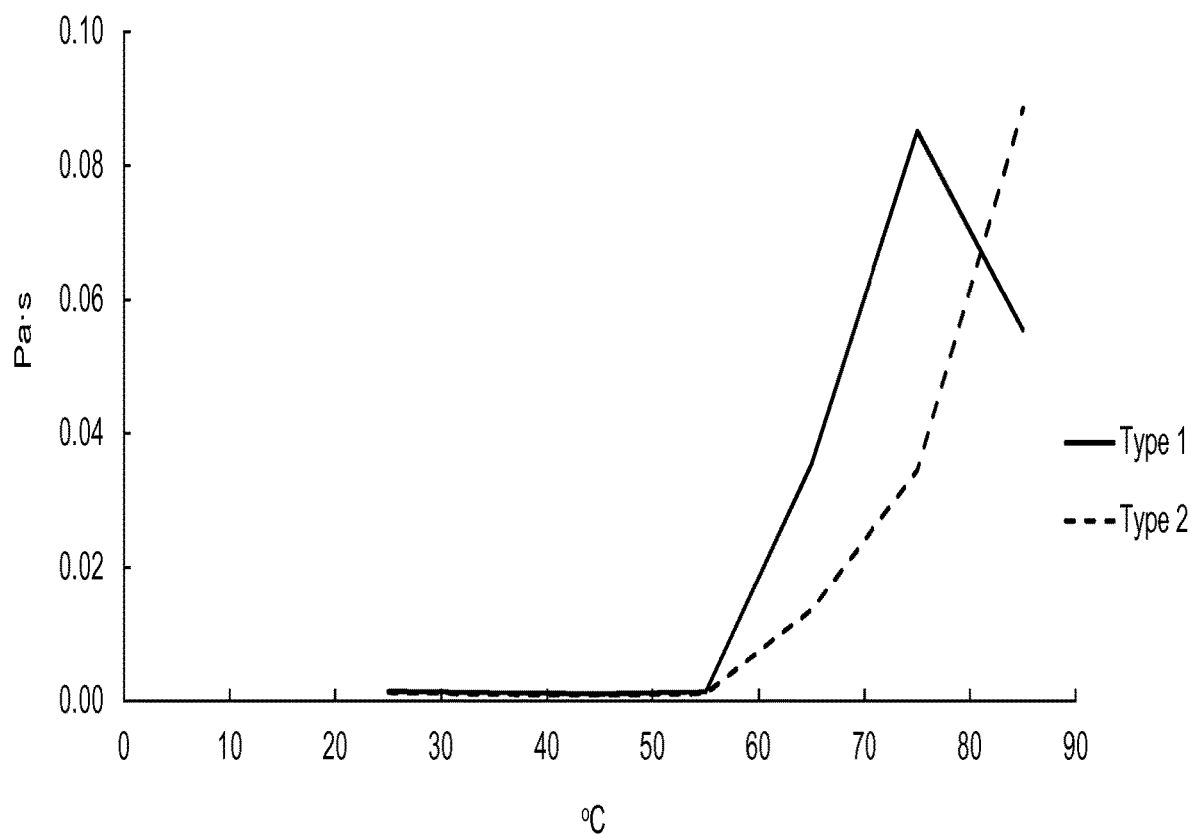

This application is the U.S. national phase of International Application No. PCT/EP2019/056446 filed Mar. 14, 2019 which designated the U.S. and claims priority to European Application No. 18162019.6 filed Mar. 15, 2018, the entire contents of each of which are hereby incorporated by reference.

TECHNICAL FIELD

The present invention relates to the cost-effective and sustainable production of easy-to-swallow dietary supplements. Dietary supplements are edible and must therefore meet the requirements set out in microbiological guidelines.

BACKGROUND OF THE INVENTION

Any food needs to have a certain microbial quality. To enhance food safety, microbiological guidelines are issued. The purpose of such guidelines is to protect public health. For infant food, particularly strict requirements apply.

One way to kill microbes (and in particular bacteria) is pasteurization. Pasteurization is not meant to kill all microorganisms. Pasteurization reduces the number of viable pathogens in food to a safe level.

Sterilization kills all microorganisms but often adversely affects the taste, nutrient content and quality of food. Therefore, it is not very common to sterilize food products.

One type of easy-to-swallow dietary supplements are extrudates.

WO 2014/164956 discloses a process for microbial reduction in nutritional products, wherein the housing of an extruder is heated. The inventors of WO 2014/164956 suggest dividing the extruder into several heating zones.

Heating of an extruder requires additional energy. Using an extra amount of energy for food production is neither sustainable nor cost-effective.

Thus, there is a need for a method for manufacturing easy-to-swallow dietary supplements, wherein pathogenic microorganisms are reduced/inactivated in a sustainable and cost-effective manner.

SUMMARY OF THE INVENTION

The problem to be solved by the present invention is the provision of easy-to-swallow dietary supplements which have a low level of pathogenic microorganisms.

The problem is solved by providing extrudates that contain vitamins and/or minerals. Said extrudates may be packaged in a sachet. For consumption, the sachet is opened and the extrudates are sprinkled over porridge or any other kind of warm, aqueous food. The extrudates disintegrate upon stirring and are therefore easy-to-swallow.

The extrudate of the invention comprises semolina and starch powder. Semolina and starch powder (such as wheat starch powder) are commercially available. However, what is commercially available often contains an unacceptable number of bacteria. Thus, the matrix of an edible extrudate must be pasteurized to reduce the number of microorganisms.

Surprisingly, pasteurization can be done within the extruder even if extrusion is done under adiabatic conditions.

Adiabatic extrusion means to operate with no input or extraction of heat, i.e. the extruder is neither cooled nor heated. Extruding under adiabatic conditions is sustainable and cost-effective because no energy is needed to heat or to cool the extruder.

However, temperature control is difficult when extruding under adiabatic conditions.

Extrudates which have been produced below pasteurization temperature must be thrown away as they may not meet the requirements of the relevant microbiological guideline. Thus, to prevent food waste, adiabatic extrusion must be done such that pasteurization temperature is reached as quickly as possible after having started the extrusion.

At the same time, adiabatic extrusion must be done such that a given maximum temperature is not exceeded. Ideally, temperature within the extruder rises quickly and then remains stable at pasteurization temperature until extrusion is finished.

Surprisingly, under adiabatic conditions, pasteurization temperature is reached quickly and then remains stable when the composition of the invention is extruded.

The composition of the invention comprises
  at least 10 weight-% starch powder, based on the total weight of the composition,
  at least 10 weight-% semolina, based on the total weight of the composition, and
  water,
  wherein the weight ratio between said starch powder and said semolina is from 5:1 to 1:5.

Without wishing to be bound to a particular theory, it is believed that viscosity of such composition increases in a controlled manner when adiabatic extrusion is started. An increase in viscosity means more friction/pressure, resulting in a temperature which is high enough for pasteurization.

The increase in viscosity depends on several factors. Semolina having a small particle size increases the viscosity of the composition in the extruder more and/or quicker than larger particles. It can be speculated that starch within the smaller particle sized semolina gelatinizes quicker. Therefore, semolina with a relative small particle size is preferred.

In a preferred embodiment of the invention, semolina is used which has a refusal to sieve 200 μm of less than 40% (m/m), of preferably less than 30% (m/m) and most preferably of less than 20% (m/m). The semolina of the invention should be flowable than thus should have a refusal to sieve 200 μm of at least than 5% (m/m).

In the context of the present invention, "% (m/m)" refers to percent by mass: the mass of what is retained by a specific sieve (e.g. 200 μm) divided by the total mass of the sieved composition, multiplied by 100%.

Instead of choosing the right semolina by particle size, a test can be performed to select suitable semolina. In a preferred embodiment of the invention, semolina is chosen such that viscosity of a mixture consisting of 10 weight-% of said semolina and 90 weight-% water, based on the total weight of said mixture, is at least 0.04 Pa·s when measured at temperature of 70° C. on the Malvern Rheometer AR G2 using a concentric rotary cylinder with a bob diameter of 27.99 mm and a length of 42.10 mm at a shear rate of 100 $s^{-1}$. The viscosity of the 10% suspension is measured 7 times and then averaged.

Similarly, starch powder is preferably chosen such that viscosity of a mixture consisting of 10 weight-% of said starch powder and 90 weight-% water, based on the total weight of said mixture, is at least 0.4 Pa·s when measured at temperature of 60° C. on the Malvern Rheometer AR G2 using a concentric rotary cylinder with a bob diameter of 27.99 mm and a length of 42.10 mm at a shear rate of 100 s$^{-1}$. The viscosity of the 10% suspension is measured 7 times and then averaged.

In the context of such tests, "weight-%" refers to the total weight of the mixture to be tested.

A preferred composition of the invention comprises
- at least 10 weight-% starch powder, based on the total weight of the composition,
- at least 10 weight-% semolina, based on the total weight of the composition, and
- water,
- wherein the weight ratio between said starch powder and said semolina is from 5:1 to 1:5, and
- wherein the viscosity of a mixture consisting of 10 weight-% of said starch powder and 90 weight-% water, based on the total weight of said mixture, is at least 0.4 Pa·s when measured at temperature of 60° C. on the Malvern Rheometer AR G2 using a concentric rotary cylinder with a bob diameter of 27.99 mm and a length of 42.10 mm at a shear rate of 100 s$^{-1}$, and/or
- wherein the viscosity of a mixture consisting of 10 weight-% of said semolina and 90 weight-% water, based on the total weight of said mixture, is at least 0.04 Pa·s when measured at temperature of 70° C. on the Malvern Rheometer AR G2 using a concentric rotary cylinder with a bob diameter of 27.99 mm and a length of 42.10 mm at a shear rate of 100 s$^{-1}$.

When such a composition is extruded under adiabatic conditions, the temperature at the extruder's die raises quickly to a temperature between 75° C. and 80° C. and then remains stable for the rest of the extrusion process, although the extruder is neither heated nor cooled. In case the desired temperature is not reached, the the feed rate and/or screw speed can be increased.

Extrudates obtained in this manner fulfill the requirements of the relevant microbiological guidelines although no extra energy has been used for heating or cooling the extruder. Therefore, the present invention also relates to a method for pasteurizing, said method comprising the adiabatic extrusion of the herein described composition.

Viscosity of a composition comprising both, starch powder and said semolina, depends on the weight ratio and the total amount of the compounds. In a preferred embodiment, the composition of the invention comprises
- at least 20 weight-% starch powder, based on the total weight of the composition,
- at least 20 weight-% semolina, based on the total weight of the composition,
- at least 5 weight-% of at least one water-soluble vitamin, based on the total weight of the composition,
- preferably at least 1 weight-% of at least one lubricant such as medium-chain triglycerides (MCT), based on the total weight of the composition, and
- 10-30 weight-% water, based on the total weight of the composition
- wherein the weight ratio between said starch powder and said semolina is from 4:1 to 1:4, preferably from 3:1 to 1:3 and most preferably from 2:1 to 1:2.

Finally, the present invention relates to the use of a composition comprising starch powder and semolina for producing easy-to-swallow dietary supplements. A preferred embodiment of the invention relates to the use of such composition for producing edible extrudates such as extrudates comprising water-soluble vitamins. Preferred water-soluble vitamins are vitamin B12 and niacinamide.

DETAILED DESCRIPTION OF THE INVENTION

Extrudates comprising vitamins are known in the art. They are solid, often contain some residual water and may resemble cylinders. If desired, these cylinders may be shaped after extrusion and before drying, e.g. by use of a spheronizer.

The size of the extrudate depends on the die that is attached to the end of the extruder. Typical extrudates of the invention resemble cylinders and have a length from 50 μm to 1500 μm.

Extrudates comprising vitamins have an edible matrix. The composition of the extrudate's matrix needs to be adapted to the chosen vitamins. Extrudates comprising fat-soluble vitamins need a different kind of matrix than extrudates comprising water-soluble vitamins.

The present invention relates preferably to extrudates comprising water-soluble vitamins. Such extrudates can be surprisingly easily be manufactured if the extrudates matrix comprises starch powder and semolina.

Manufacturing Principle

Preferably, a twin-screw extruder having multiple barrels is used. Each or some of said barrels may have inlet.

Preferably, a dry mixture of starch powder, semolina and vitamins/micronutrients is fed into a first barrel of the extruder. Water is then fed into a second barrel of the extruder, said second barrel being located downstream of said first barrel. The amount of water fed into said second barrel is adjusted such that a cuttable strand exits the extruder's die. The optional lubricant is then fed into a third barrel of the extruder, said third barrel being located downstream of said second barrel.

According to the invention, extrusion is done under adiabatic conditions, i.e. the extruder is neither cooled nor heated. In a preferred embodiment of the present invention, adiabatic conditions also mean that the components being fed into the extruder (i.e. starch powder, semolina, vitamins/micronutrients, water and lubricant) have room temperature.

Temperature starts to rise soon after having started the extrusion process. Once the temperature at the die is high enough for pasteurization, die face cutting may begin.

Surprisingly, a temperature high enough for pasteurization is reached more quickly if a composition as herein described is extruded. Furthermore, the temperature at the die remains surprisingly stable (e.g. in a range between 70° C. and 80°) if a composition as herein described is extruded. Further adjustments of the temperature can be done by choosing suitable values for the extrusion parameters (such as feed rate, screw speed etc.).

After die face cutting, the extrudates may need drying. This can be done as described in the literature, e.g. by use of a fluid bed dryer. Optionally, the extrudates may be shaped (e.g. with a spheronizer) before drying.

The dried extrudates may be sieved before packaging and storage.

The present invention relates to a method for manufacturing extrudates, said method comprising the extrusion of a composition comprising
- at least 10 weight-% starch powder, based on the total weight of the composition,
- at least 10 weight-% semolina, based on the total weight of the composition, and
- water, wherein the weight ratio between said starch powder and said semolina is from 5:1 to 1:5, preferably from 4:1 to 1:4, more preferably from 3:1 to 1:3 and most preferably from 2:1 to 1:2.

The present invention also relates to a method for manufacturing extrudates comprising the steps:
- feeding a mixture comprising (i) at least 10 weight-% starch powder, based on the total weight of the composition, (ii) at least 10 weight-% semolina, based on the total weight of the composition, and (iii) vitamins into a first barrel of an extruder
- feeding water into a second barrel of the extruder, said second barrel being located downstream of said first barrel, and
- feeding at least one lubricant into a third barrel of the extruder, said third barrel being located downstream of said second barrel,
- wherein the weight ratio between said starch powder and said semolina is from 5:1 to 1:5, and wherein said weight ratio is preferably from 4:1 to 1:4, more preferably from 3:1 to 1:3 and most preferably from 2:1 to 1:2.

In a preferred embodiment of the invention, the method for manufacturing extrudates comprises the extrusion of a composition, said composition comprising
- at least 20 weight-% starch powder, based on the total weight of the composition,
- at least 20 weight-% semolina, based on the total weight of the composition,
- at least 5 weight-% of at least one water-soluble vitamin, based on the total weight of the composition,
- preferably at least 1 weight-% of at least one lubricant such as medium-chain triglycerides (MCT), based on the total weight of the composition, and
- 10-30 weight-% water, based on the total weight of the composition,
- wherein the weight ratio between said starch powder and said semolina is from 4:1 to 1:4, preferably from 3:1 to 1:3 and most preferably from 2:1 to 1:2.

The present invention also relates to a method for manufacturing extrudates, said method comprising the extrusion of a composition, said composition comprising
- at least 10 weight-%, preferably at least 20 weight-% starch powder, based on the total weight of the composition,
- at least 10 weight-% semolina, preferably at least 20 weight-%, based on the total weight of the composition, and
- water,
- wherein the weight ratio between said starch powder and said semolina is from 5:1 to 1:5, preferably from 4:1 to 1:4, more preferably from 3:1 to 1:3 and most preferably from 2:1 to 1:2, and
- wherein the particle size of said starch powder and the particle size of said semolina is chosen such that a temperature of at least 70° C. is reached at the extruder's die not later than 30 minutes after the start of the adiabatic extrusion, when a Rheomex PTW16/25 OS Twin Screw extruder is used (length/diameter ratio=25; screw speed=200 rpm; feed rate: 300 g/h).

The present invention also relates to a method for manufacturing extrudates, said method comprising the extrusion of a composition, said composition comprising
- at least 10 weight-%, preferably at least 20 weight-% starch powder, based on the total weight of the composition,
- at least 10 weight-% semolina, preferably at least 20 weight-%, based on the total weight of the composition, and
- water,
- wherein the weight ratio between said starch powder and said semolina is from 5:1 to 1:5, preferably from 4:1 to 1:4, more preferably from 3:1 to 1:3 and most preferably from 2:1 to 1:2, and
- wherein the viscosity of a mixture consisting of 10 weight-% of said semolina and 90 weight-% water, based on the total weight of said mixture, is lower at 85° C. than the viscosity of the same mixture at 75° when measured on a Malvern Rheometer AR G2 using a concentric rotary cylinder with a bob diameter of 27.99 mm and a length of 42.10 mm at a shear rate of 100 $s^{-1}$, and/or
- wherein the viscosity of a mixture consisting of 10 weight-% of said starch powder and 90 weight-% water, based on the total weight of said mixture, is lower at 85° C. than the viscosity of the same mixture at 75° when measured on a Malvern Rheometer AR G2 using a concentric rotary cylinder with a bob diameter of 27.99 mm and a length of 42.10 mm at a shear rate of 100 $s^{-1}$.

The present invention also relates to a method for manufacturing extrudates, said method comprising the extrusion of a composition, said composition comprising
- at least 10 weight-%, preferably at least 20 weight-% starch powder, based on the total weight of the composition,
- at least 10 weight-% semolina, preferably at least 20 weight-%, based on the total weight of the composition, and
- water,
- wherein the weight ratio between said starch powder and said semolina is from 5:1 to 1:5, preferably from 4:1 to 1:4, more preferably from 3:1 to 1:3 and most preferably from 2:1 to 1:2, and
- wherein said semolina has a particle size d(0.9) from 300 μm to 500 μm, preferably from 350 μm to 450 μm when measured on the Malvern Mastersizer 2000 connected to a Scirocco 2000 dry dispenser unit with a 60% vibration feed, 0.1 bar dispersive air pressure and measured with a continuous obscuration (7.0±1%) over 35 s, and/or
- wherein said starch powder has a particle size d(0.9) from 10 μm to 300 μm, preferably from 30 μm to 100 μm when measured on the Malvern Mastersizer 2000 connected to a Scirocco 2000 dry dispenser unit with a 60% vibration feed, 0.1 bar dispersive air pressure and measured with a continuous obscuration (7.0±1%) over 35 s.

The present invention also relates to a method for manufacturing extrudates, said method comprising the extrusion of a composition, said composition comprising
- at least 10 weight-%, preferably at least 20 weight-% starch powder, based on the total weight of the composition,
- at least 10 weight-% semolina, preferably at least 20 weight-%, based on the total weight of the composition, and
- water,
- wherein the weight ratio between said starch powder and said semolina is from 5:1 to 1:5, preferably from 4:1 to 1:4, more preferably from 3:1 to 1:3 and most preferably from 2:1 to 1:2, and wherein the viscosity of a mixture consisting of 10 weight-% of said starch powder and 90 weight-% water, based on the total weight of said mixture, is at least 0.4 Pa·s when measured at temperature of 60° C. on when measured on a Malvern Rheometer AR G2 using a concentric rotary cylinder with a bob diameter of 27.99 mm and a length of 42.10 mm at a shear rate of 100 s$^{-1}$, and/or wherein the viscosity of a mixture consisting of 10 weight-% of said semolina and 90 weight-% water, based on the total weight of said mixture, is at least 0.04 Pa·s when measured at temperature of 70° C. on when measured on a Malvern Rheometer AR G2 using a concentric rotary cylinder with a bob diameter of 27.99 mm and a length of 42.10 mm at a shear rate of 100 s$^{-1}$.

In the method of the present invention, said starch powder is preferably wheat starch powder.

The present invention also relates to extrudates obtainable by the claimed method for manufacturing extrudates.

Water-Soluble Vitamins

Preferably, the extrudate of the present invention comprises water-soluble vitamins and other preferably water-soluble micronutrients. In one embodiment, the extrudate of the invention is obtainable by extrusion of a composition comprising:

a source of vitamin $B_1$, such as thiamine mononitrate
a source of vitamin $B_2$, such as riboflavin or riboflavin 5'-phosphate sodium
a source of vitamin $B_6$, such as pyridoxine hydrochloride
a source of vitamin PP, such as niacinamide
a source of vitamin $B_{12}$, such as crystalline vitamin $B_{12}$
optionally tricalcium phosphate and/or
folic acid.

Preferably, the extrudate of the invention is obtainable by extrusion of a composition comprising
at least 10 weight-%, preferably at least 20 weight-% starch powder, based on the total weight of the composition,
at least 10 weight-%, preferably at least 20 weight-% semolina, based on the total weight of the composition,
thiamine mononitrate, riboflavin 5'-phosphate sodium, pyridoxine hydrochloride niacinamide, crystalline vitamin B12 and/or folic acid, and
water,
wherein the weight ratio between said starch powder and said semolina is from 5:1 to 1:5, preferably from 4:1 to 1:4, more preferably from 3:1 to 1:3 and most preferably from 2:1 to 1:2.

The amount of water-soluble vitamins and other micronutrients is selected such that an adult does not have to swallow more than 10-50 extrudates per day to stay healthy. Therefore, one embodiment of the invention relates to an extrudate obtainable by extrusion of a composition comprising
at least 10 weight-%, preferably at least 20 weight-% starch powder, based on the total weight of the composition,
at least 10 weight-%, preferably at least 20 weight-% semolina, based on the total weight of the composition,
at least 5 weight-% of at least one water-soluble vitamin, based on the total weight of the composition, wherein said water-soluble vitamins are selected from the group consisting of vitamin B1, vitamin B2, vitamin B6, vitamin PP and vitamin B12,
optionally folic acid, and
water,
wherein the weight ratio between said starch powder and said semolina is from 5:1 to 1:5, preferably from 4:1 to 1:4, more preferably from 3:1 to 1:3 and most preferably from 2:1 to 1:2.

Water-soluble vitamins and other water-soluble micronutrients are commercially available. A preferred supplier is DSM® Nutritional Products. Riboflavin is available under the tradename Riboflavin Universal®.

Although not totally excluded, it is not foreseen to include any fat-soluble vitamins except folic acid. In a preferred embodiment of the invention, a lubricant such as medium-chain triglycerides (MCT) is the only fat-soluble compound in the extrudate.

Thus, one embodiment of the invention relates to an extrudate obtainable by extrusion of a composition consisting of
at least 10 weight-%, preferably at least 20 weight-% starch powder, based on the total weight of the composition,
at least 10 weight-%, preferably at least 20 weight-% semolina, based on the total weight of the composition,
at least 5 weight-% of at least one water-soluble vitamin, based on the total weight of the composition,
optionally at least one further water-soluble micronutrient and/or folic acid,
preferable at least one lubricant such as medium-chain triglycerides (MCT), and
water,
wherein the weight ratio between said starch powder and said semolina is from 5:1 to 1:5, preferably from 4:1 to 1:4, more preferably from 3:1 to 1:3 and most preferably from 2:1 to 1:2.

In the context of the present invention and also in above described embodiments, wheat starch powder is the preferred starch powder.

Semolina

The extrudate of the invention comprises commercially available semolina. Semolina is a granular product consisting of particles that have mostly sharp edges and corners. It is obtained from milling and sieving of durum wheat, cleaned of impurities.

Semolina particles may be smaller or larger, depending on how milling and sieving is done. Viscosity of aqueous semolina increases (i) sharply and/or (ii) at lower temperature if semolina having smaller particles is used. Therefore, when extruding with constant parameters (e.g. screw speed) under adiabatic conditions, pasteurization temperature is reached more quickly when semolina having smaller particles is used.

In a preferred embodiment of the invention, semolina is used which has a refusal to sieve 200 µm of less than 40% (m/m), of preferably less than 30% (m/m) and most preferably of less than 20% (m/m). Said semolina has preferably a refusal to sieve 500 µm of less than 30% (m/m) and/or refusal to sieve 390 µm of less than 40% (m/m) and/or refusal to sieve 280 µm of less than 40% (m/m) and/or refusal to sieve 112 µm of less than 10% (m/m).

In another embodiment of the inventions, semolina is chosen such that the viscosity of a mixture consisting of 10 weight-% of said semolina and 90 weight-% water, based on the total weight of said mixture, is at least 0.04 Pa·s when measured at temperature of 70° C. on the Malvern Rheometer AR G2 using a concentric rotary cylinder with a bob diameter of 27.99 mm and a length of 42.10 mm at a shear rate of 100 s$^{-1}$, and/or such that the viscosity of a mixture consisting of 10 weight-% of said semolina and 90 weight-% water, based on the total weight of said mixture, is lower at 85° C. than the viscosity of the same mixture at 75° C. when measured on the Malvern Rheometer AR G2 using a concentric rotary cylinder with a bob diameter of 27.99 mm and a length of 42.10 mm at a shear rate of 100 s$^{-1}$, and/or such that semolina has a particle size d(0.9) from 300 μm to 500 μm, preferably from 350 μm to 450 μm when measured on the Malvern Mastersizer 2000 connected to a Scirocco 2000 dry dispenser unit with a 60% vibration feed, 0.1 bar dispersive air pressure and measured with a continuous obscuration (7.0±1%) over 35 s.

Surprisingly, if semolina is chosen in such manner, temperature during adiabatic extrusion is well controlled.

Starch Powder

The extrudate of the invention comprises commercially available starch powder. A preferred supplier is Roquette. The preferred starch powder is wheat starch powder.

Starch powder as used in the context of the present invention is white in appearance and is, in contrast to semolina, not flowable. Visually, it resembles flour, although it might be lighter than most flours.

The particles of starch powder may be smaller or larger, depending how milling and sieving are done. Viscosity of aqueous starch powder raises (i) sharply and/or (ii) at lower temperature if starch powder having smaller particles is used. Therefore, pasteurization temperature is reached more quickly when extruding under adiabatic conditions.

In a preferred embodiment of the invention, starch powder is used which has a refusal to sieve 200 μm of less than 5% (m/m), preferably less than 3% (m/m) and most preferably less than 1% (m/m). Preferably, said starch powder has a refusal to sieve 200 μm of at least 0.05% (m/m).

In another embodiment of the invention, starch powder is chosen such that the viscosity of a mixture consisting of 10 weight-% of said starch powder and 90 weight-% water, based on the total weight of said mixture, is at least 0.4 Pa·s when measured at temperature of 60° C. on the Malvern Rheometer AR G2 using a concentric rotary cylinder with a bob diameter of 27.99 mm and a length of 42.10 mm at a shear rate of 100 s$^{-1}$, and/or such that the viscosity of a mixture consisting of 10 weight-% of said starch powder and 90 weight-% water, based on the total weight of said mixture, is lower at 85° C. than the viscosity of the same mixture at 75° C. when measured on the Malvern Rheometer AR G2 using a concentric rotary cylinder with a bob diameter of 27.99 mm and a length of 42.10 mm at a shear rate of 100 s$^{-1}$, and/or such that starch powder has a particle size d(0.9) from 10 μm to 300 μm, preferably from 30 μm to 100 μm when measured on the Malvern Mastersizer 2000 connected to a Scirocco 2000 dry dispenser unit with a 60% vibration feed, 0.1 bar dispersive air pressure and measured with a continuous obscuration (7.0±1%) over 35 s.

Surprisingly, if starch powder is chosen in such manner, temperature during adiabatic extrusion is well controlled when extruding a composition as herein described. This is particularly true if said starch powder is wheat starch powder and/or if said starch powder is mixed with the semolina as described herein.

Composition of the Extrudate

The extrudate of the invention comprises semolina as herein described, starch powder as herein described and vitamins/micronutrients as herein described.

Thus, the present invention also relates to the use of a mixture comprising starch powder and semolina for manufacturing extrudates that comprise water-soluble vitamins and/or micronutrients. When such mixture is extruded under adiabatic conditions, temperature is well controlled. Thus, the present invention also relates to the use of a mixture comprising starch powder and semolina for controlling temperature during adiabatic extrusion.

The extrudate of the invention is obtainable by extrusion of a composition comprising
- at least 10 weight-%, preferably at least 20 weight-% starch powder, based on the total weight of the composition,
- at least 10 weight-%, preferably at least 20 weight-% semolina, based on the total weight of the composition, and
- water,
- wherein the weight ratio between said starch powder and said semolina is from 5:1 to 1:5 preferably from 4:1 to 1:4, more preferably from 3:1 to 1:3 and most preferably from 2:1 to 1:2, and
- wherein said starch powder and/or said semolina is chosen as described in the preceding paragraphs.

In a preferred embodiment of the invention, the extrudate is obtainable by extrusion of a composition comprising
- at least 20 weight-% starch powder, based on the total weight of the composition,
- at least 20 weight-% semolina, based on the total weight of the composition,
- at least 5 weight-% of at least one water-soluble vitamin, based on the total weight of the composition,
- preferably at least 1 weight-% of at least one lubricant such as medium-chain triglycerides (MCT), based on the total weight of the composition, and
- 10-30 weight-% water, based on the total weight of the composition,
- wherein the weight ratio between said starch powder and said semolina is from 5:1 to 1:5 preferably from 4:1 to 1:4, more preferably from 3:1 to 1:3 and most preferably from 2:1 to 1:2, and
- wherein said starch powder and/or said semolina is chosen as described in the preceding paragraphs.

In the most preferred embodiment of the invention, the extrudate is obtainable by extrusion of a composition comprising
- at least 20 weight-% starch powder, based on the total weight of the composition,
- at least 20 weight-% semolina, based on the total weight of the composition,
- at least 5 weight-% of at least one water-soluble vitamin, based on the total weight of the composition, said water-soluble vitamins being selected from the group consisting of vitamin B1, vitamin B2, vitamin B6, vitamin PP and vitamin B12,
- folic acid
- preferably at least 1 weight-% of at least one lubricant such as medium-chain triglycerides (MCT), based on the total weight of the composition, and
- water,
- wherein the weight ratio between said starch powder and said semolina is from 2:1 to 1:2, and
- wherein the viscosity of a mixture consisting of 10 weight-% of said semolina and 90 weight-% water, based on the total weight of said mixture, is lower at 85° C. than the viscosity of the same mixture at 75° C. when measured on the Malvern Rheometer AR G2 using a concentric rotary cylinder with a bob diameter of 27.99 mm and a length of 42.10 mm at a shear rate of 100 s$^{-1}$, and/or
- wherein the viscosity of a mixture consisting of 10 weight-% of said starch powder and 90 weight-% water, based on the total weight of said mixture, is lower at 85° C. than the viscosity of the same mixture at 75° C. when measured on the Malvern Rheometer AR G2 using a concentric rotary cylinder with a bob diameter of 27.99 mm and a length of 42.10 mm at a shear rate of 100 s$^{-1}$.

FIGURES

FIG. 1 shows the temperature dependency of the viscosity of aqueous semolina type 1 and aqueous semolina type 2, respectively. Viscosity is shown on the y-axis in [Pa·s] whereas temperature is shown on the x-axis in [° C.]. For further details, see below example 1.

Figure 2:
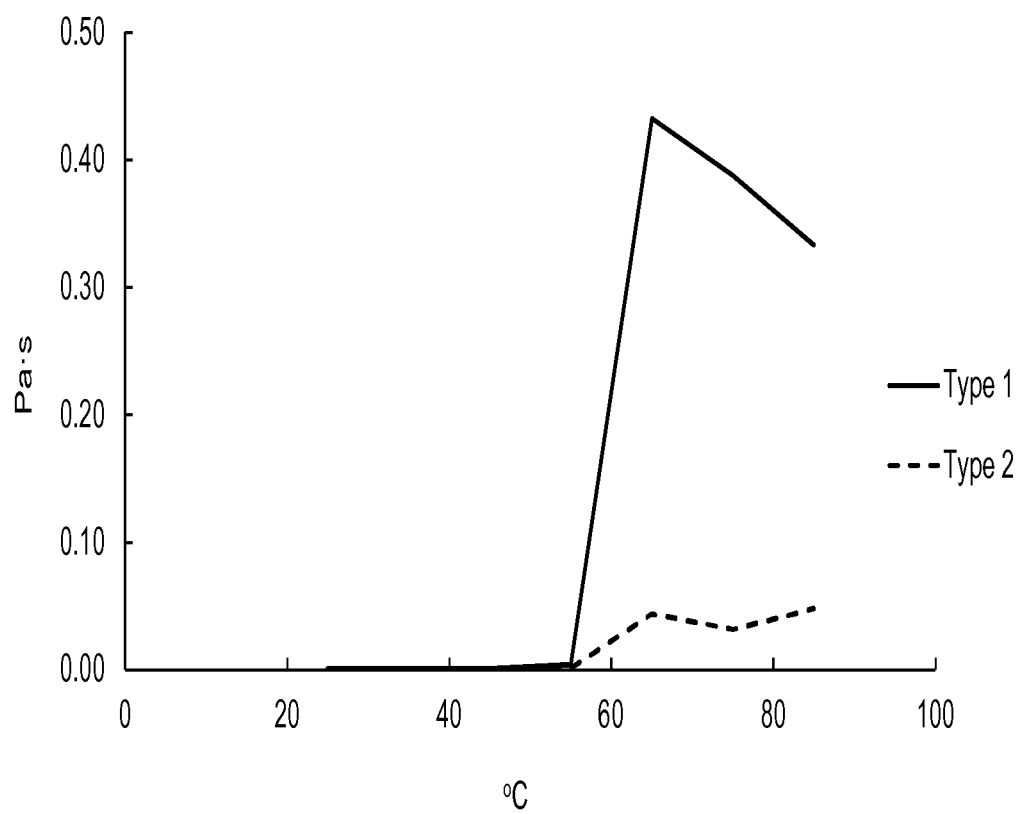

FIG. 2 shows the temperature dependency of the viscosity of aqueous wheat starch type1 and aqueous wheat starch type 2, respectively. Viscosity is shown on the y-axis in [Pa·s] whereas temperature is shown on the x-axis in [° C.]. For further details, see below example 2.

Figure 3:
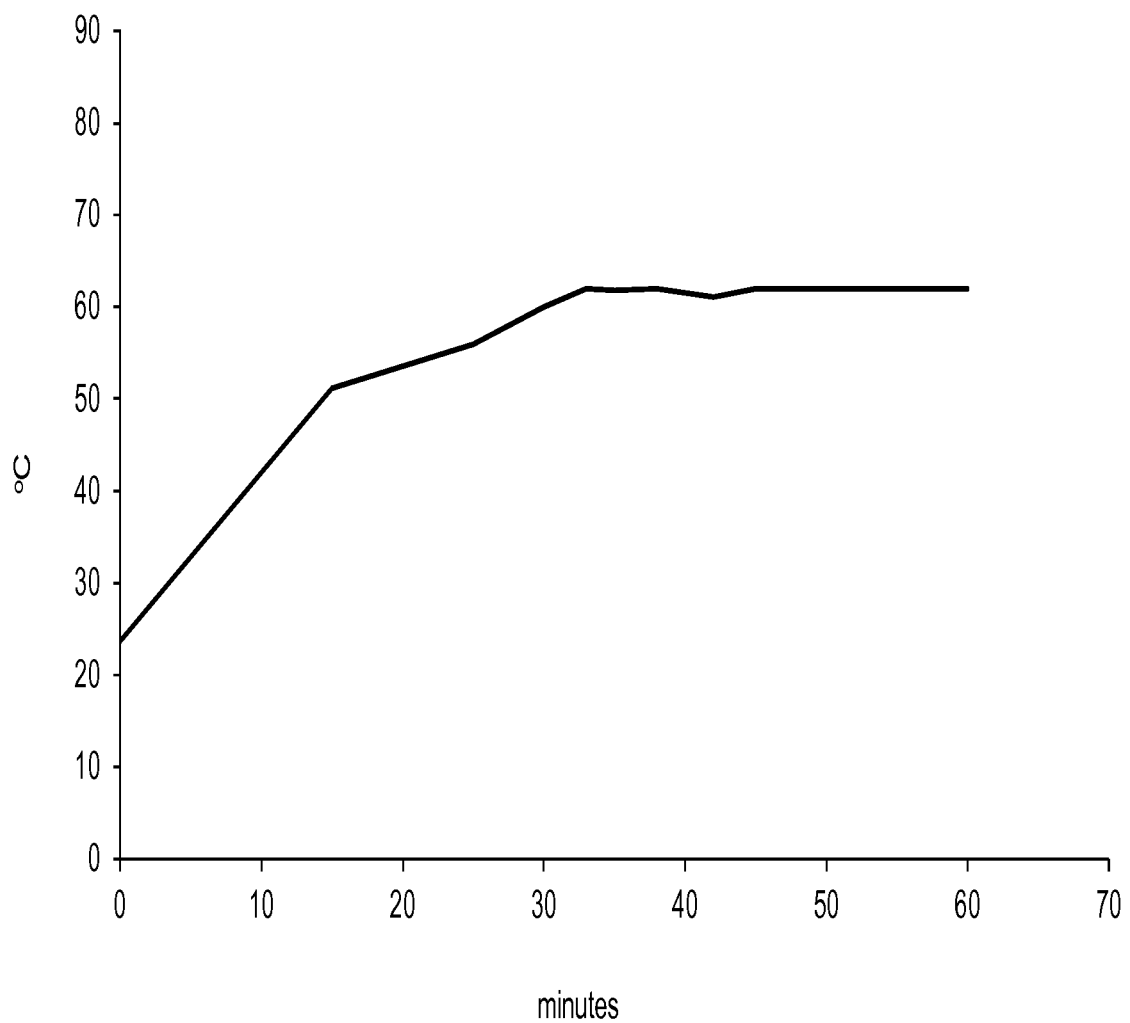

FIG. 3 shows the temperature at the extruder's die from the start of the extrusion (t=0) to the end of extrusion at a feed rate of 300 g/h. Temperature is shown on the y-axis in [° C.] whereas time is shown in minutes on the x-axis. For further details, see below example 3.

Figure 4:
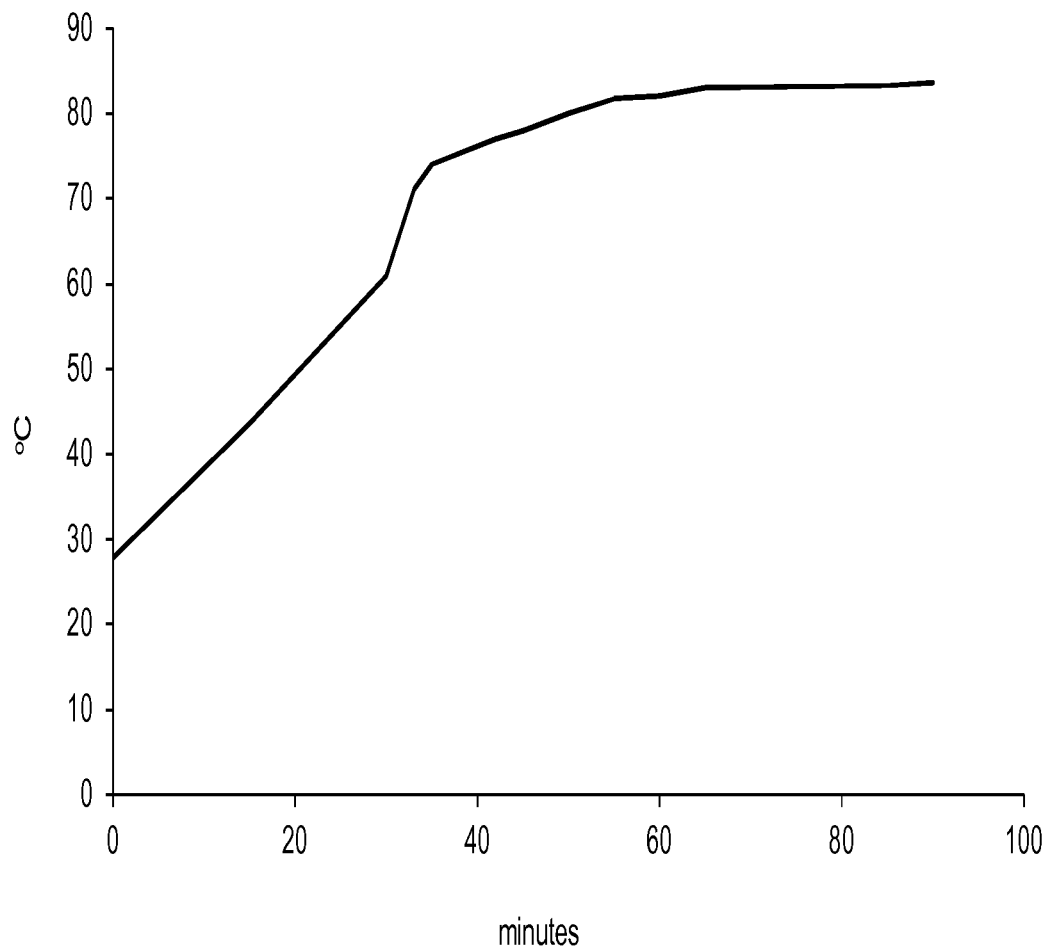

FIG. 4 shows the temperature at the extruder's die from the start of the extrusion (t=0) to the end of extrusion at a feed rate of 500 g/h. Temperature is shown on the y-axis in [° C.] whereas time is shown in minutes on the x-axis. For further details, see below example 4.

Figure 5:
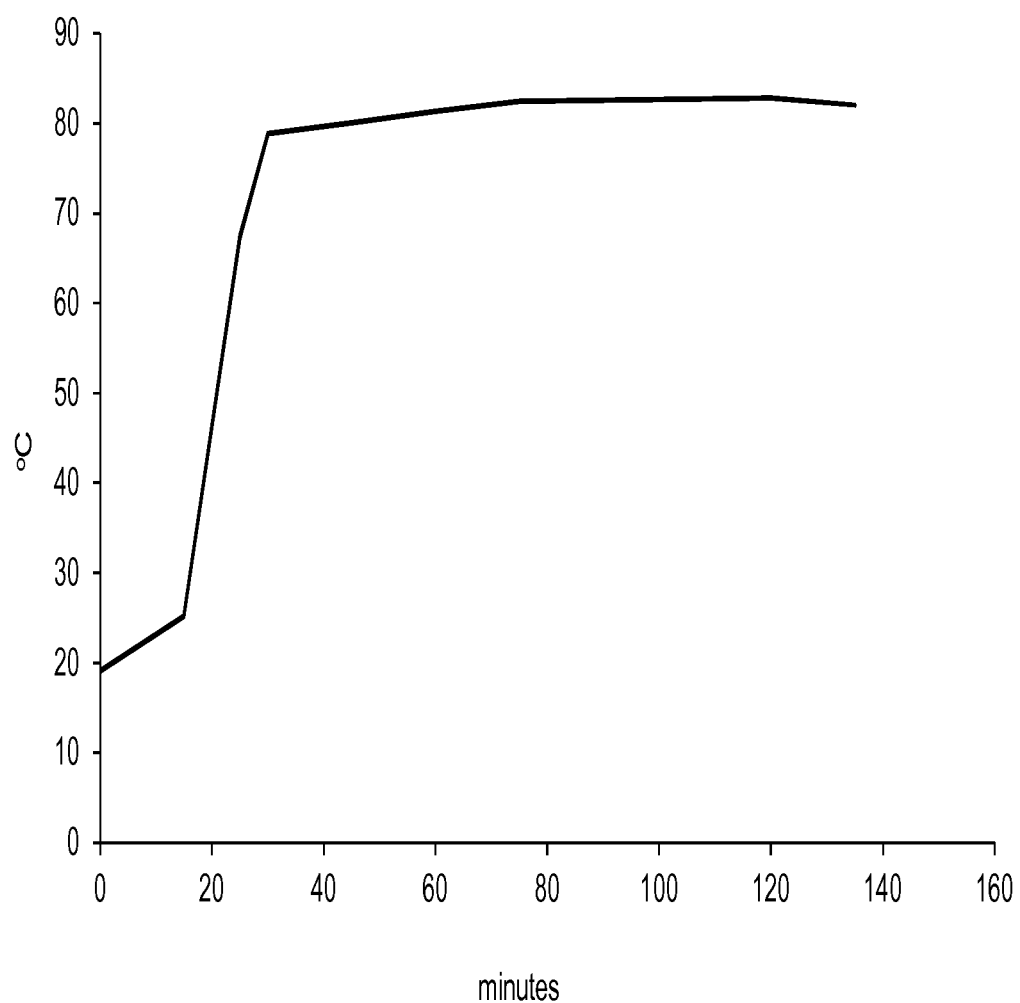

FIG. 5 shows the temperature at the extruder's die from the start of the extrusion (t=0) to the end of extrusion at a feed rate of 300 g/h. Temperature is shown on the y-axis in [° C.] whereas time is shown in minutes on the x-axis. For further details, see below example 5.

EXAMPLE 1

Semolina

Two different types of semolina were tested: Type 1 has a smaller particle size than type 2. Accordingly, when semolina type 2 is sieved, more particles remain in the sieve (200 μm) than when semolina type 1 is sieved. Details are given in TABLE 1.

Semolina type 1 was mixed with water. The obtained mixture consisted of 10 weight-% of said semolina and 90 weight-% water, based on the total weight of said mixture.

Similarly, semolina type 2 was mixed with water. The obtained mixture consisted of 10 weight-% of said semolina and 90 weight-% water, based on the total weight of said mixture.

Then, the viscosity of both mixtures is measured on a Malvern Rheometer AR G2 using a concentric rotary cylinder with a bob diameter of 27.99 mm and a length of 42.10 mm at a shear rate of 100 s$^{-1}$. The 10% suspension was heated stepwise from 25-85° C. and the viscosity measured 7 times at each temperature step and then averaged. The results of both tests are shown in FIG. 1.

TABLE 1

Semolina, as tested in Example 1.

|  | Semolina Type 1 | Semolina Type 2 |
| --- | --- | --- |
| Description | Granular product, obtained from milling and sieving of wheat | Granular product, obtained from milling and sieving of wheat |
| refusal to sieve 200 μm | 10 ± 5% (m/m) | 75 ± 5% (m/m) |
| flowability | yes | yes |
| Density | 670 g/l | 753 g/l |

FIG. 1 shows that the increase in viscosity depends on the particle size of semolina. The viscosity of the mixture comprising semolina type 1 (small particle size) starts increasing at lower temperature than the viscosity of the mixture comprising semolina type 2 (large particle size).

Furthermore, maximum viscosity of the mixture comprising semolina type 1 (small particle size) is reached at lower temperature than maximum viscosity of the mixture comprising semolina type 2 (large particle size).

Surprisingly, the differences between the two types of semolina are most prominent in a temperature range between 55° C. and 80° C. This temperature range is particularly important for the extrusion of vitamins (cf. examples 3, 4 and 5).

At a temperature between 60° C. and 70° C., the mixture comprising semolina type 1 (small particle size) has a higher viscosity than semolina type 2 (large particle size). Without wishing to be bound to a particular theory, it is believed that smaller particles are more susceptible for gelatinization than larger particles.

At a temperature between 75° C. and 85° C., however, aqueous semolina type 1 (small particle size) has a lower viscosity than aqueous semolina type 2 (large particle size). It is believed that the observed decrease in viscosity helps to make sure that a pre-determined maximum temperature is not exceeded during adiabatic extrusion.

In the adiabatic extrusion of example 5 (vide infra), semolina type 1 (small particle size) was used. It appears that the temperature dependency of the viscosity of semolina type 1 (small particle size) triggers a quick temperature increase at the beginning of adiabatic extrusion which ensures that the temperature does not go beyond 100° C. Temperatures of more than 100° C. would be detrimental to vitamins.

EXAMPLE 2

Wheat Starch Powder

Two different types of wheat starch powders were tested. Both powders were white in appearance and, in contrast to semolina, not flowable: Type 1 has a lower d(0.9) value than type 2, indicating a smaller particle size.

The d(0.9) value was measured on a Malvern Mastersizer 2000 connected to a Scirocco 2000 dry dispenser unit with a 60% vibration feed, 0.1 bar dispersive air pressure and measured with a continuous obscuration (7.0±1%) over 35 s.

Details about the two types of wheat starch powder are given in TABLE 2.

Wheat starch powder type 1 was mixed with water. The obtained mixture consisted of 10 weight-% of said wheat starch and 90 weight-% water, based on the total weight of said mixture.

Similarly, wheat starch powder type 2 was mixed with water. The obtained mixture consisted of 10 weight-% of said wheat starch and 90 weight-% water, based on the total weight of said mixture.

Then, the viscosity of both mixtures was measured as described in example 1.

The result of both tests is shown in FIG. 2.

TABLE 2 wheat starch powder, tested in Example 2.

|  | Wheat starch powder Type 1 | Wheat starch powder Type 2 |
| --- | --- | --- |
| Description | very fine powder that creaks when pressed between the fingers | White powder |
| d(0.9) value | approx. 50 μm | approx. 400 μm |
| Flowability | no | no |
| density | More than 568 g/l | Approx. 523 g/l |

FIG. 2 shows that the increase in viscosity depends on the particle size of wheat starch powder. As the temperature is being raised, the viscosity of the mixture comprising wheat starch powder type 1 (small particle size) increases a lot more than the viscosity of the mixture comprising wheat starch powder type 2 (large particle size).

Furthermore, maximum viscosity of the mixture comprising wheat starch powder type 1 (small particle size) is a lot higher than maximum viscosity of the mixture comprising wheat starch powder type 2 (large particle size).

The differences between the two types of wheat starch powder are most prominent in a temperature above 55° C.

At a temperature above 55° C., wheat starch powder type 1 (small particle size) has a higher viscosity than semolina type 2 (large particle size). Without wishing to be bound to a particular theory, it is believed that smaller particles are more susceptible for gelatinization than larger particles.

At a temperature of above 65° C., however, the viscosity of the mixture comprising wheat starch powder type 1 (small particle size) begins to decrease. It is believed that the observed decrease helps controlling the maximum temperature during adiabatic extrusion.

In the adiabatic extrusion of example 5 (vide infra), wheat starch powder type 1 (small particle size) was used in combination with semolina type 1 (small particle size). It appears that the temperature dependency of the viscosity of such mixture triggers a quick temperature raise at the beginning of adiabatic extrusion and prevents at the same time that temperature goes beyond 100° C. Temperatures of more than 100° C. would be detrimental to vitamins.

EXAMPLE 3

Matrix Type 2

Extrudates were obtained by extrusion of a composition shown in TABLE 3. As a matrix, wheat starch powder type 2 of example 2 and semolina type 2 of example 1 was mixed in a weight ratio 1:1.

TABLE 3 composition being extruded in Example 3

| compound | Place of insertion | content in weight-%, based on the total weight of the composition |
| --- | --- | --- |
| wheat starch powder type 2 | Barrel #1 | 35.64 |
| semolina type 2 |  | 35.64 |
| Vitamins and minerals |  | 14.59 |
| water | Barrel #2 | 10.54 |
| MCT | Barrel #4 | 3.59 |

A Rheomex PTW16/25 OS Twin Screw extruder with a length/diameter ratio 25, fitted with a 0.8 mm die consisting of 15 holes (Thermo Fischer, Karlsruhe), has been used. A Haake Polylab drive (Thermo Fischer, Karlsruhe) unit was connected to the extruder.

A blend of wheat starch powder, semolina and all the water-soluble active ingredients (i.e. vitamins and micronutrients) were added into the first barrel of the extruder (feed rate: 300 g/h). Water was then added in a second barrel of the extruder, said second barrel being located downstream of said first barrel. The lubricant (i.e. MCT) was then added into barrel 4 of the extruder, said barrel being located downstream of said barrel 2.

The screw of the extruder had two stress zones for ensuring adequate mixing. Stress zone one was located after barrel 2 whereas a second stress zone was located after barrel 4.

The extrusion took place under adiabatic conditions, i.e. the extruder was neither cooled nor heated and the compounds being inserted into the extruder (e.g water) had room temperature. The temperature was measured at the die of the extruder during the complete extrusion (60 minutes); the result is shown in FIG. 3.

Die face cutting began once a cuttable extrusion strand appeared that the die. Sample were taken at regular intervals and the sample was then dried on a fluid bed dryer. The dried extrudates had residual water of about 5 weight-%, based on the total weight of the dried extrudate.

FIG. 3 shows that the temperature of the die increased and then remained stable a 60° C. FIG. 3 also shows that it took approx. 30 minutes to reach a temperature of approx. 60° C.

EXAMPLE 4

Matrix Type 2

Example 3 was repeated. This time, however, feed rate was increased from 300 g/h to 500 g/h.

Similar to example 2, the extrusion took place under adiabatic conditions, i.e. the extruder was neither cooled nor heated and the compounds being inserted into the extruder (e.g. water) had room temperature. The temperature was measured at the die of the extruder during the complete extrusion (90 minutes); the result is shown in FIG. 4.

In contrast to example 3, the temperature kept raising. Probably because a higher feed rate (500 g/h vs. 300 g/h) had been applied, a temperature high enough to ensure pasteurization was reached. However, it took almost approx. 50 minutes to reach a temperature high enough for pasteurization. Thus, similar to example 3, the increase in temperature at the beginning of the adiabatic extrusion was relatively slow.

Extrudates being produced at temperature below 70° C. (i.e. extrudates produced in the first 30 minutes) had to be discharged.

EXAMPLE 5

Matrix Type 1

Example 3 was repeated (i.e. feed rate: 300 g/h). This time, however, wheat starch powder type 1 of example 2 (instead of type 2) and semolina type 1 of example 1 (instead of type 2) was used. For details, reference is made to TABLE 4.

TABLE 4 composition being extruded in Example 5

| compound | Place of insertion | content in weight-%, based on the total weight of the composition |
|---|---|---|
| wheat starch powder type 1 | Barrel #1 | 35.64 |
| semolina type 1 | | 35.64 |
| Vitamins and minerals | | 14.59 |
| water | Barrel #2 | 10.54 |
| MCT | Barrel #4 | 3.59 |

Again, the extrusion took place under adiabatic conditions, i.e. the extruder was neither cooled nor heated and the compounds being inserted into the extruder (e.g water) had room temperature. The temperature was measured at the die of the extruder during the complete extrusion (130 minutes); the result is shown in FIG. 5.

Surprisingly, a temperature plateau of approx. 82° C. was reached although a feed rate of 300 g/h only was applied.

Furthermore, said temperature plateau was reached very quickly. In example 4, it took almost 50 minutes to reach a temperature of approx. 82° C. In example 5, a similar temperature was reached after about 30 minutes.

Thus, using a mixture of type 1 semolina and type 1 wheat starch powder allows to reach pasteurization temperature quickly and prevents at the same time unacceptable high temperatures.

EXAMPLE 6

Application in Food

Porridge was prepared. Approx. 40 extrudates of example 5 were sprinkled over the warm porridge. After stirring with a spoon, no extrudates could be discovered upon visual inspection, i.e. the extrudates had been disintegrated. Porridge is easy-to-swallow.

EXAMPLE 7

Microbial Quality

The microbial quality of the semolina type 1 as used in example 1 was tested. The test revealed that total aerobic bacteria count (measured in CFU/g) was about 50 times higher than the regulatory limit. Yeasts and moulds (measured in CFU/g) was also above regulatory limit. Furthermore, a significant amount of *Salmonella* spp. and *Staphylococcus aureus* was detected.

Applicable regulatory limits are shown in below Table 5. CFU refers to "colony forming units".

TABLE 4

| regulatory limits | | |
|---|---|---|
| Parameter | Limit | Unit |
| Total aerobic bacteria count | 1000 | CFU/g |
| Yeats & Moulds | 100 | CFU/g |
| *E. coli* | absent | in 10 g |
| *Salmonella* spp. | absent | in 50 g |
| *Staphylococcus aureus* | absent | in 10 g |

The microbial quality of the extrudate produced in example 5 was then tested. In said example, semolina type 1 was used. Extrudates being produced below pasteurization temperature were discharged.

In said extrudate, that total aerobic bacteria count (measured in CFU/g) was about 500 times lower than in the semolina as such and thus, fulfilled the regulatory limit. Yeasts and moulds (measured in CFU/g) was also below regulatory limit. Neither *Salmonella* spp. nor *Staphylococcus aureus* was detected in the extrudate.

Thus, example 7 shows that a temperature high enough to manufacture extrudate of good microbial quality can be reached under adiabatic conditions when the composition of the invention is used.

The invention claimed is:

1. A pasteurized extrudate which comprises a composition comprising, based on total weight of the composition:
   at least 10 wt. % of a starch powder,
   at least 10 wt. % of semolina,
   at least 5 wt. % of at least one water-soluble vitamin, and water, wherein
   the starch powder and semolina are separate components of the composition and are present in a weight ratio of the starch powder to the semolina of 5:1 to 1:5, and wherein
   the starch powder has a particle size d(0.9) from 10 μm to 300 μm when measured on the Malvern Mastersizer 2000 connected to a Scirocco 2000 dry dispenser unit with a 60% vibration feed, 0.1 bar dispersive air pressure and measured with a continuous obscuration of 7.0±1% over 35 s, and wherein
   the extrudate is pasteurized by extrusion under adiabatic conditions.

2. The pasteurized extrudate according to claim 1, wherein the composition comprises:
   at least 20 wt. % of the starch powder,
   at least 20 wt. % of the semolina,
   at least 1 wt. % of at least one lubricant, and
   10-30 wt. % of the water, wherein
   the weight ratio of the starch powder to the semolina is from 4:1 to 1:4.

3. The pasteurized extrudate according to claim 1, wherein
   the extrude comprises the semolina and a first mixture consisting of 10 wt. % of the starch powder and 90 wt. % of the water, based on the total weight of the first mixture, has a viscosity which is at least 0.4 Pa·s when measured at temperature of 60° C. on a Malvern Rheometer AR G2 using a concentric rotary cylinder with a bob diameter of 27.99 mm and a length of 42.10 mm at a shear rate of 100 s$^{-1}$ and/or
   the extrudate comprises the starch powder and a second mixture consisting of 10 wt. % of the semolina and 90 wt. % of the water, based on the total weight of the second mixture, has a viscosity which is at least 0.04 Pa·s when measured at temperature of 70° C. on the Malvern Rheometer AR G2 using a concentric rotary cylinder with a bob diameter of 27.99 mm and a length of 42.10 mm at a shear rate of 100 s$^{-1}$.

4. The pasteurized extrudate according to claim 1, wherein
the extrudate comprises the starch powder and a first mixture consisting of 10 wt. % of the semolina and 90 wt. % of the water, based on the total weight of the first mixture, has a viscosity which is lower at 85° C. than the viscosity of the first mixture at 75° C. when measured on a Malvern Rheometer AR G2 using a concentric rotary cylinder with a bob diameter of 27.99 mm and a length of 42.10 mm at a shear rate of 100 s$^{-1}$, and/or
the extrudate comprises the semolina and a second mixture consisting of 10 wt. % of the starch powder and 90 wt. % of the water, based on the total weight of the second mixture, has a viscosity which is lower at 85° C. than the viscosity of the second mixture at 75° C. when measured on the Malvern Rheometer AR G2 using a concentric rotary cylinder with a bob diameter of 27.99 mm and a length of 42.10 mm at a shear rate of 100 s$^{-1}$.

5. The pasteurized extrudate according to claim 1, wherein
the semolina has a particle size d(0.9) from 300 μm to 500 μm when measured on a Malvern Mastersizer 2000 using a concentric rotary cylinder with a bob diameter of 27.99 mm and a length of 42.10 mm at a shear rate of 100 s$^{-1}$.

6. The pasteurized extrudate according to claim 1, wherein the starch powder is wheat starch powder.

7. The pasteurized extrudate according to claim 1, wherein the semolina is durum semolina.

8. The pasteurized extrudate according to claim 1, wherein the semolina has a refusal to sieve 200 μm of less than 40% (m/m), and/or the starch powder has a refusal to sieve 200 μm of less than 5% (m/m).

9. The pasteurized extrudate according to claim 8, wherein the weight ratio of the starch powder to the semolina is from 4:1 to 1:4.

10. The pasteurized extrudate according to claim 8, wherein the weight ratio of the starch powder to the semolina is from 3:1 to 1:3.

11. The pasteurized extrudate according to claim 8, wherein the weight ratio of the starch powder to the semolina is from 2:1 to 1:2.

12. The pasteurized extrudate according to claim 8, wherein the semolina has a refusal to sieve 200 μm of less than 30% (m/m), and/or the starch powder has a refusal to sieve 200 μm of less than 3% (m/m).

13. The pasteurized extrudate according to claim 8, wherein the semolina has a refusal to sieve 200 μm of less than 20% (m/m), and/or the starch powder has a refusal to sieve 200 μm of less than 1% (m/m).

14. The pasteurized extrudate according to claim 1, further comprising vitamin B12, folic acid and/or niacinamide.

15. The pasteurized extrudate according to claim 2, wherein the weight ratio of the starch powder to the semolina is from 3:1 to 1:3.

16. The pasteurized extrudate according to claim 2, wherein the weight ratio of the starch powder to the semolina is from 2:1 to 1:2.

17. The pasteurized extrudate according to claim 1, wherein the starch powder has a particle size d(0.9) of from 30 μm to 100 μm.

18. The pasteurized extrudate according to claim 1, wherein the semolina has a refusal to sieve 200 μm of less than 40% (m/m).

19. The pasteurized extrudate according to claim 1, wherein the semolina has a refusal to sieve 200 μm of less than 30% (m/m).

20. The pasteurized extrudate according to claim 1, wherein the semolina has a refusal to sieve 200 μm of less than 20% (m/m).

21. A sachet or a stick pack comprising the pasteurized extrudate according to claim 1.

\* \* \* \* \*